United States Patent [19]

Biagini et al.

[11] Patent Number: 5,762,701
[45] Date of Patent: Jun. 9, 1998

[54] POZZOLANIC COMPOSITIONS

[75] Inventors: Stefano Biagini, Treviso; Mario Collepardi, Villorba, both of Italy

[73] Assignee: MBT Holding AG, Zurich, Switzerland

[21] Appl. No.: 973,870

[22] Filed: Nov. 10, 1992

Related U.S. Application Data

[63] Continuation of Ser. No. 743,845, Aug. 12, 1991, abandoned, which is a continuation of Ser. No. 483,196, Feb. 22, 1990, abandoned.

[30] Foreign Application Priority Data

Feb. 24, 1989 [GB] United Kingdom ............ 8904273

[51] Int. Cl.$^6$ .................................................. C04B 18/14
[52] U.S. Cl. ................. 106/705; 106/707; 106/DIG. 1
[58] Field of Search ................................ 106/481, 484, 106/485, DIG. 1, 705, 707

[56] References Cited

U.S. PATENT DOCUMENTS

| | | | |
|---|---|---|---|
| 3,832,434 | 8/1974 | Flood et al. | 264/117 |
| 4,052,220 | 10/1977 | Turpin, Jr. | 106/90 |
| 4,126,423 | 11/1978 | Kongsgaarden | 23/293 |
| 4,126,424 | 11/1978 | Kongsgaarden | 23/293 |
| 4,310,486 | 1/1982 | Cornwell et al. | 264/309 |
| 4,321,243 | 3/1982 | Cornwell et al. | 423/268 |
| 4,354,876 | 10/1982 | Webster | 106/85 |
| 4,384,896 | 5/1983 | Aitcin et al. | 1006/288 B |
| 4,504,320 | 3/1985 | Rizer et al. | 106/98 |
| 4,642,137 | 2/1987 | Heitzmann et al. | 106/85 |
| 4,686,252 | 8/1987 | Burge et al. | 524/3 |
| 4,741,782 | 5/1988 | Styron | 106/309 |
| 5,236,501 | 8/1993 | Nomachi et al. | 106/723 |

FOREIGN PATENT DOCUMENTS

| | | |
|---|---|---|
| 0263303 | 4/1988 | European Pat. Off. |
| 2629196 | 1/1978 | Germany. |
| 60-151266 | 8/1985 | Japan. |
| 61-26541 | 2/1986 | Japan. |
| 2 131 409 | 6/1984 | United Kingdom. |
| 2163421 | 2/1986 | United Kingdom. |
| 2170237 | 6/1986 | United Kingdom. |
| WO 87/02978 | 5/1987 | WIPO. |

OTHER PUBLICATIONS

Chemical Abstract No. 98:21372m (1983).
Chemical Abstract No. 84: 78723s (1976).

*Primary Examiner*—Paul Marcantoni
*Attorney, Agent, or Firm*—Fish & Richardson P.C.

[57] ABSTRACT

Storing, transporting and dispensing of silica fume containing pozzolanic compositions can be improved by mixing an amount of water in the range of 2 to 25% with the silica fume containing composition so that a uniform humidified powder is obtained. The treated silica fume containing composition has higher bulk gravity and better flow characteristics.

11 Claims, No Drawings

POZZOLANIC COMPOSITIONS

This is a continuation of application Ser. No. 07/743,845, filed Aug. 12, 1991 now abandon which in turn is a continuation of application Ser. No. 07/483,196, filed Feb. 22, 1990, now abandoned.

The invention relates to improved pozzolanic compositions containing silica fume and to a method for the production of such improved compositions. Such compositions are useful as admixtures for cementitious compositions.

BACKGROUND OF THE INVENTION

According to ASTM C 618 a pozzolan is defined as a "siliceous or siliceous and aluminous material which in itself possesses little or no cementitious value but will, in finely divided form and in the presence of moisture, chemically react with calcium hydroxide at ordinary temperature to form compounds possessing cementitious properties." Besides natural pozzolans, many industrial byproducts are rapidly becoming the primary source of artificial pozzolans in use today. Power plants using rice husks or coal as fuel, and metallurgical furnaces producing iron, silicon and ferrosilicon alloys are the main source of artificial pozzolans like fly ash, rice husk ash, blast furnace slag, silica fume, etc.

Silica fume, sometimes known as volatilized silica or condensed silica fume, is manufactured by electric arc furnaces as a byproduct of the production of metallic silicon or ferrosilicon alloys. In the transformation of quartz to silicon at temperatures of about 2000° C., a gaseous SiO oxidises to $SiO_2$ and condenses in the form of special fine particles consisting of amorphous silica. Silica fume is removed by filtering the outgoing gases in a bag filter. The pozzolanic activity of silica fume, that is the chemical reactivity with calcium hydroxide, is substantially due to the non crystalline character of silica and the very high specific surface area (10 to 30 $m^2/g$), which in turn depends on the very small particle size (much lower than 1 μm). For the same reason, however, silica fume has a relatively low bulk gravity (about 0.2 to 0.3 tonne/$m^3$), so that shipping and storing costs are relatively high. Moreover, silica fume forms a lot of dust product and is difficult to cause to flow. It cannot be moved into storage silos by pneumatic lines, bucket elevator or screen conveyor as easily as cement can be.

SUMMARY OF THE INVENTION

According to the invention there is provided a method for humidifying to increase the flowability of pozzolanic compositions comprising:
 spraying from 2 to 25% by weight of water on pozzolanic compositions containing silica fume; and
 stirring the material by a mechanical mixer until a uniformly humidified powder results. All weights are by weight of the pozzolanic compositions.

Pozzolanic compositions treated according to the present invention having a small amount of water are uniform humidified powders which have a higher bulk gravity, are virtually dustless, flow easily, can be stored in ordinary cement silos and transported in bulk cement tankers. Moreover, such pozzolanic compositions can be dispensed through the same systems as used for cement.

The water used to humidify the pozzolanic compositions containing silica fume is optionally an aqueous solution of well known chemical admixtures, generally utilized in cement mortars or concrete mixes, such as accelerators, retarders, air-entraining agents, water reducers and superplasticizers.

DETAILED DESCRIPTION OF THE PREFERRED EMBODIMENTS

Pozzolanic compositions according to the invention are mixtures of silica fume with natural pozzolan or other artificial pozzolans such as fly ash, rice husk ash, blast furnace slag, etc. Preferably the pozzolanic compositions according to the invention contain at least 50% by weight of silica fume. The preferred material treated according to the invention is a mixture of silica fume with fly ash containing 80% by weight of silica fume and 20% by weight of fly ash.

The amount of water used in the method of the invention is critical in order to obtain a uniformly humidified powder with the recited advantages. If an amount below 2% is used, no particular effect can be observed. If an amount above 25% is used, the obtained powder will rather be a slurry with all the disadvantages well known in the art. Preferably the amount of water used is from 10% to 20% by weight.

The time required for the treatment according to the invention depends on the amount of pozzolanic composition containing silica fume and of water being mixed and on the effectiveness of the mechanical mixing equipment. Generally, when using an ordinary laboratory mixer, a few minutes of mixing will suffice for an even distribution of the preferred 10 to 20% of water.

In order to have some quantitative indication about the improvement of the bulk gravity two different tests have been developed: one consists in measuring the weight of loose material in a container of a given volume and calculating the weight/volume ratio in kg/l or tonne/m3; the other is the so called slide test: a brass ring placed on a smooth plastic (Plexiglass) horizontal plate is filled with the loose powder material; the brass ring is removed so that a powder disc (100 mm in diameter and 20 mm thick) is obtained; the slope of the plastic table (420 mm in length) is increased until all material has slipped down into a container; the angle at which the material flows down is the "angle of slide" which is an indication for the powder flowability.

The humidified silica fume containing powder according to the invention can be used in a conventional way to improve the properties of cement mortars and of concrete mixes and it has been observed that, in comparison to cement mortars or concrete mixes containing known silica fume dust and superplasticizer, an improved fluidity is obtained with silica fume containing powder which has been humidified with an aqueous solution of superplasticizer. Flow table tests according to ASTM C 230 have been carried out to evaluate these effects.

A preferred humidified silica fume containing pozzolanic powder according to the present invention comprises
 i. 66% to 84% by weight of silica fume plus fly ash;
 ii. 10% to 20% by weight of water; and
 iii. 6% to 14% by weight of a superplasticizer, plasticizer or a mixture thereof.

The invention is illustrated by the following examples in which all percentage are by weight and temperatures are in centigrades.

EXAMPLE 1

Silica fume samples from the Norwegian firm Elkem ($SiO_2$=97%, specific surface area according to BET method is 16 $m^2/g$) are mixed with fly ash in a ratio of 4:1 and treated with varying amounts of water by spraying with a laboratory sprayer into an ordinary laboratory mixer of the Hobart type. The mixing time is 2 minutes for all the samples and the amounts of water vary from 0.1, 1, 2, 5, 10, 20, to 25% based on the weight of the silica fume containing powder. The bulk gravity of the obtained powders is determined by the bulk gravity test and by the slide test. It is observed that with amounts of water above 2% the bulk gravity increases from 0.3 kg/l (for the untreated powder) to a value of 0.6 kg/l (for the powder treated with 20% of water) and that the angle of slide for untreated powder is about 38°, whereas angles below 30° are sufficient for the humidified samples. When the water content is higher than 25% the powder is transformed into a water slurry so that the measurement is no longer meaningful. Similar results have been obtained by using silica fume of different origin (from companies in Italy, France and Germany).

EXAMPLE 2

Dry untreated silica fume containing powders (80% by weight silica fume and 20% by weight fly ash) and water treated powders are used to manufacture cement mortar mixes including ordinary Portland cement, Torre del Lago (Italy) sand used in standard Italian tests for mortars, mixing water and superplasticizer (Rheobuild 1000). The cement/sand weight ratio is ⅓. The amount of superplasticizer is 3% by weight of cement. The water/cement weight ratio is 2:5. In calculating the water/cement ratio the amount of water includes both batched water and water coming from the superplasticizer (40% solution) and/or humidified powder, i.e. all the mortar mixes are manufactured with the same amount of total water independently of the water content in the treated powders. Whereas the fluidity of the mixes with untreated powders is 110% according to ASTM C 230, the mixes with water treated powders show a fluidity of 125 to 150% when the powder has been treated with water amounts of 5 to 20%.

EXAMPLE 3

The same tests as described in Example 2 are carried out with a mixture of silica fume (60% by weight) and fly ash (40% by weight). The fluidity of the cement mortar with the untreated silica fume/fly ash mixture is 130% according to ASTM C 230, whereas the mortars with treated silica fume/fly ash mixture show a fluidity of 140 to 170%, when this mixture has been treated with water amounts of 5, 10, 15 and 20%.

We claim:

1. A method of forming a humidified pozzolanic powder comprising spraying from 2 to 25% by weight of water on a pozzolanic composition while stirring the pozzolanic composition by means of a mechanical mixer until a uniformly humidified powder is obtained, said pozzolanic composition comprising from 50% to 80% by weight of silica fume and from 20% to 50% by weight of one or more non-silica fume pozzolans, all weights being based on the weight of the pozzolanic composition.

2. A method according to claim 1 wherein the amount of water is 10% to 20% by weight based on the weight of the pozzolanic composition.

3. A method according to claim 1 wherein the water contains an admixture selected from the group consisting of superplasticizers, plasticizers or mixtures thereof.

4. A method according to claim 3 in which the water contains a superplasticizer.

5. A uniformly humidified pozzolanic powder comprising a pozzolanic composition and 2% to 25% by weight of water, said pozzolanic composition comprising from 50% to 80% by weight of silica fume and from 20% to 50% by weight of a non-silica fume pozzolan, all weights based on the the total weight of the pozzolanic composition.

6. A uniformly humidified pozzolanic powder according to claim 5 wherein the non-silica fume pozzolan is fly ash.

7. A uniformly humidified pozzolanic powder according to claim 5 wherein said pozzolanic composition contains 80% by weight of silica fume and 20% by weight of fly ash.

8. A uniformly humidified pozzolanic powder according to claim 5 wherein the amount of water is 10 to 20% by weight based on the weight of the pozzolanic composition.

9. A uniformly humidified pozzolanic powder according to claim 6 which additionally includes a superplasticizer, a plasticizer or a mixture thereof.

10. A uniformly humidified pozzolanic powder according to claim 9 comprising i. 66% to 84% by weight of silica fume plus fly ash;
   ii. 10% to 20% by weight of water; and
   iii. 6% to 14% by weight of a superplasticizer, plasticizer or a mixture thereof.

11. A method of manufacturing a cement mortar or a concrete mix which comprises adding to the cement mortar or concrete mix a uniformly humidified pozzolanic powder comprising a pozzolanic composition and 2% to 25% by weight of water, said pozzolanic composition comprising from 50% to 80% by weight of silica fume and from 20% to 50% by weight of a non-silica fume pozzolan, all weights based on the weight of the pozzolanic composition.

* * * * *